United States Patent
Zhou et al.

(10) Patent No.: US 10,166,609 B2
(45) Date of Patent: Jan. 1, 2019

(54) SELF-LOCKING DRILL CHUCK

(71) Applicant: ZHEJIANG SANOU MACHINERY CO. LTD., Zhejiang (CN)

(72) Inventors: Wenhua Zhou, Zhejiang (CN); Xuebiao Tong, Zhejiang (CN); Yanxing Xu, Zhejiang (CN)

(73) Assignee: ZHEJIANG SANOU MACHINERY CO. LTD., Zhejiang (CN)

( * ) Notice: Subject to any disclaimer, the term of this patent is extended or adjusted under 35 U.S.C. 154(b) by 0 days.

(21) Appl. No.: 15/493,887

(22) Filed: Apr. 21, 2017

(65) Prior Publication Data

US 2017/0304906 A1 Oct. 26, 2017

(30) Foreign Application Priority Data

Apr. 25, 2016 (CN) ............ 2016 2 0361541 U

(51) Int. Cl.
  *B23B 31/12* (2006.01)
(52) U.S. Cl.
  CPC ........ *B23B 31/123* (2013.01); *B23B 31/1238* (2013.01); *B23B 2231/38* (2013.01); *B23B 2260/136* (2013.01); *Y10T 279/17632* (2015.01)
(58) Field of Classification Search
  CPC ............ B23B 31/123; B23B 31/1238; Y10T 279/17615; Y10T 279/17623; Y10T 279/17632
  See application file for complete search history.

(56) References Cited

U.S. PATENT DOCUMENTS

| 5,499,830 | A | * | 3/1996 | Schnizler | B23B 31/123 279/140 |
| 5,765,839 | A | * | 6/1998 | Rohm | B23B 31/1215 279/140 |
| 5,775,704 | A | * | 7/1998 | Wilson | B23B 31/1238 279/140 |
| 6,341,783 | B1 | * | 1/2002 | Rohm | B23B 31/123 279/140 |
| 6,843,485 | B2 | * | 1/2005 | Sakamaki | B23B 31/123 279/140 |
| 7,503,565 | B2 | * | 3/2009 | Rohm | B23B 31/123 279/140 |

(Continued)

FOREIGN PATENT DOCUMENTS

EP    1314499 A1 *  5/2003 ........... B23B 31/123

*Primary Examiner* — Eric A Gates
(74) *Attorney, Agent, or Firm* — Muncy, Geissler, Olds & Lowe, P.C.

(57) ABSTRACT

The present invention provide a self-locking drill chuck, its rotating sleeve is provided with a convex leaf spring fixed to a rotating sleeve at both ends, its nut or ring fixedly connected with the nut are provided with a first groove and a second groove matching with the convex portion of the leaf spring; the self-locking structure includes a ring tooth on the drill body and rotatable locking block arranged on the nut or ring fixedly connected to the nut, the nut or ring fixedly connected to the nut is provided with a leaf spring, the rotating sleeve is provided with a first part compressing the leaf spring and a second part compressing the locking block. This invention can achieve positioning matching between metals, which has a stronger holding force for maintaining self-locking state of the drill chuck, greatly enhancing the operating feel.

3 Claims, 3 Drawing Sheets

(56) References Cited

U.S. PATENT DOCUMENTS

| | | | | |
|---|---|---|---|---|
| 7,726,663 B2 * | 6/2010 | Mack | ................... | B23B 31/123 279/125 |
| 7,726,917 B2 * | 6/2010 | Mack | ................... | B23B 31/123 279/140 |
| 7,841,601 B2 * | 11/2010 | Mack | ................... | B23B 31/123 279/140 |
| 8,056,906 B2 * | 11/2011 | Mack | ................... | B23B 31/123 279/140 |
| 8,070,168 B2 * | 12/2011 | Mack | ................... | B23B 31/123 279/125 |
| 8,262,096 B2 * | 9/2012 | Mack | ................... | B23B 31/123 279/140 |
| 8,740,227 B2 * | 6/2014 | Zhou | ................... | B23B 31/123 279/140 |
| 9,016,699 B2 * | 4/2015 | Sakamaki | ............. | B23B 31/123 279/62 |

* cited by examiner

SELF-LOCKING DRILL CHUCK

FIELD OF THE INVENTION

The present invention relates to a self-locking drill chuck.

BACKGROUND

In the prior art, the drill chuck is provided with a drill body, a clamping jaw, a nut, and by rotating the nut to move the clamping jaw forward or backward, the drilling tool is clamped or loosened by the drill chuck. The self-locking structure in the drill chuck is designed to prevent the drill chuck from being dislodged by the reaction force applied during operation. Usually the parts with leaf spring are coordinated with the teeth on the drill body. The drill chuck is a structure maintaining self-locking state or non-self-locking state, which is formed by matching between the convex on the leaf spring and groove on the inner wall of engineering plastics of the rotating sleeve; under a high-speed rotation state, its retention force is sometimes inadequate, to make self-locking failure.

SUMMARY

The object of the present invention is to provide a self-locking drill chuck, which can reliably maintain self-locking state when working. To this end, the invention adopts the following technical solutions:

A self-locking drill chuck, including a drill body, a nut, a clamping jaw, a self-locking structure, a rotating sleeve, wherein the rotating sleeve is provided with a convex leaf spring fixed to a rotating sleeve at both ends, the nut or ring fixedly connected with the nut are provided with a first groove and a second groove matching with the convex portion of the leaf spring, the first groove is a groove corresponding to the drill chuck in the self-locking state, and the second groove is a groove converting from self-locking state to unlocking state corresponding to the drill chuck; the self-locking structure includes a ring tooth on the drill body and rotatable locking block arranged on the nut or ring fixedly connected to the nut, the nut or ring fixedly connected to the nut is provided with a leaf spring, the rotating sleeve is provided with a first part compressing the leaf spring and a second part compressing the locking block, and by compressing the leaf spring via the first part, the leaf spring compresses the locking block, to rotate the locking block and engage with teeth on the drill body, drill chuck enters self-locking, and through compressing the locking block by the second part, the locking block reverses to break away from the tooth, a gap between the rotating sleeve and the tooth is provided with for lifting the locking block out of the tooth.

Further, the leaf spring is a rotatable leaf spring and a run-out groove of the leaf spring is provided in the rotating sleeve.

Further, a rotatable locking block and a leaf spring are provided on the ring, and a double-layer mounting plate is provided on the ring for installation of locking block revolving shaft and leaf spring revolving shaft.

By adopting the technical solutions, this invention can achieve positioning matching between metals, which has a stronger holding force for maintaining self-locking state of the drill chuck, greatly enhancing the operating feel.

DETAILED DESCRIPTION

Figure 1:
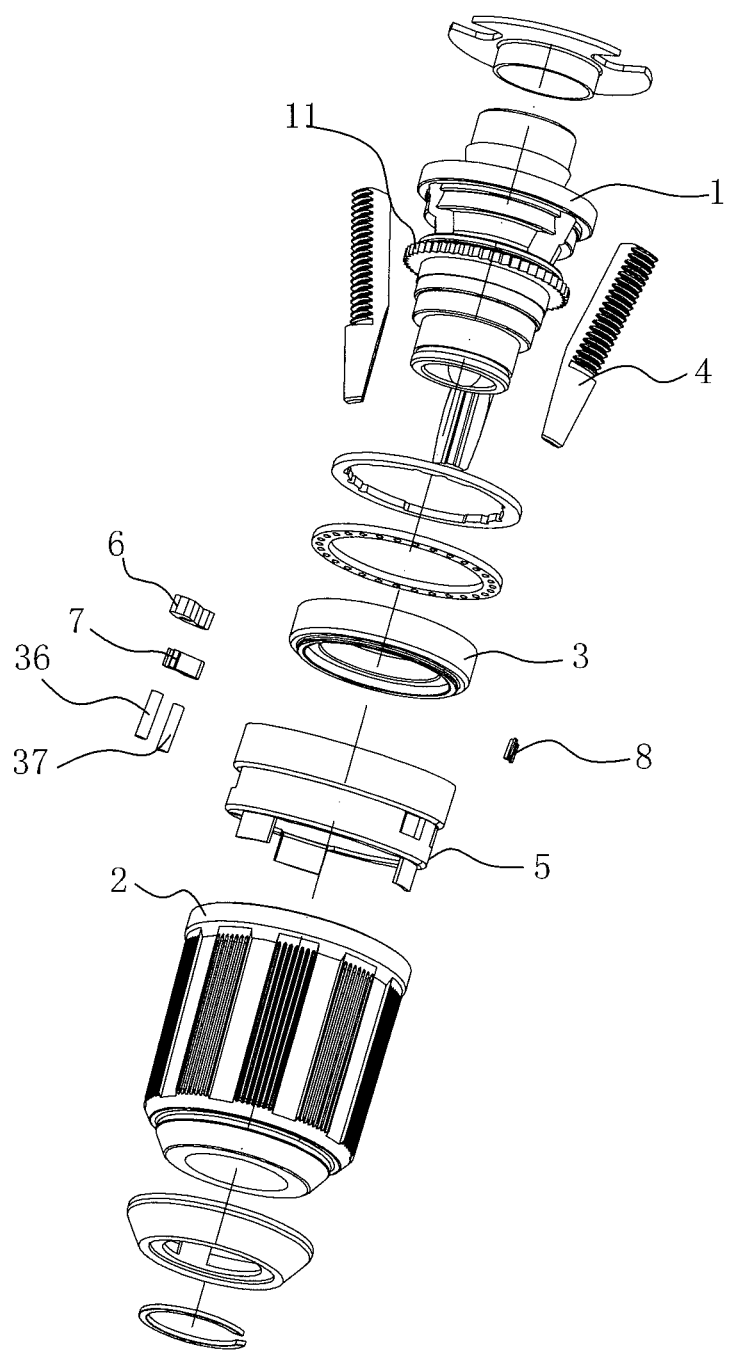
FIG. 1 is an exploded view of an embodiment of the present invention.

Referring to the figure, this invention provides a self-locking drill chuck, including a drill body 1, a nut 3, a clamping jaw 4, a self-locking structure, a rotating sleeve 2, wherein the rotating sleeve 2 is provided with a convex leaf spring 8 fixed to a rotating sleeve 2 at both ends, the ring 5 fixedly connected with the nut 3 is provided with a first groove 51 and a second groove 52 matching with the convex portion of the leaf spring 8. The ring 5 is a metal nut cover, which is covered outside of the nut with interference fit, to combine two semi-bodies of nut into a complete nut.

Figure 2:
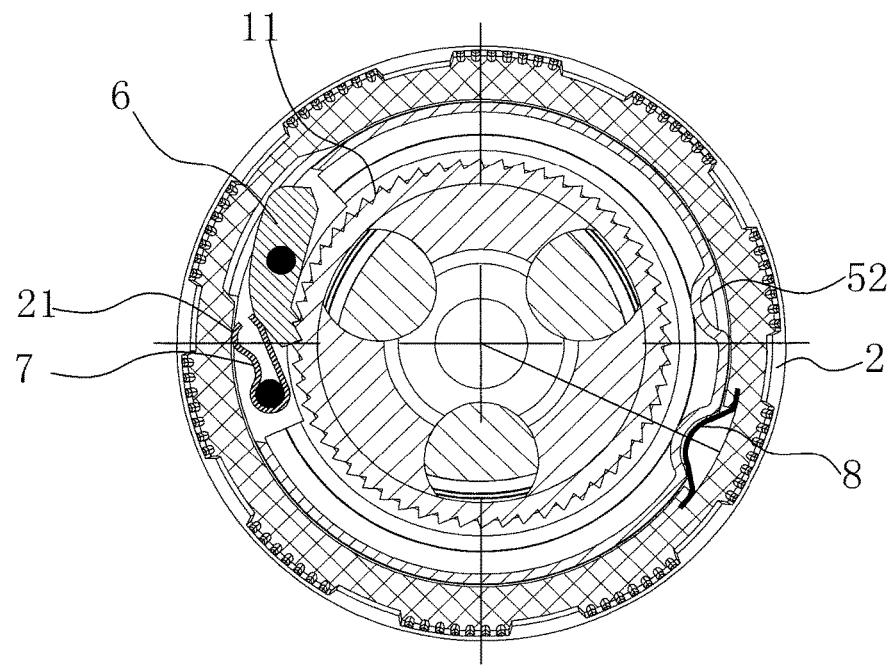
FIG. 2 is a cross-sectional view of an embodiment of the present invention, showing the matching of the self-locking structure under the self-locking state.
Figure 3:
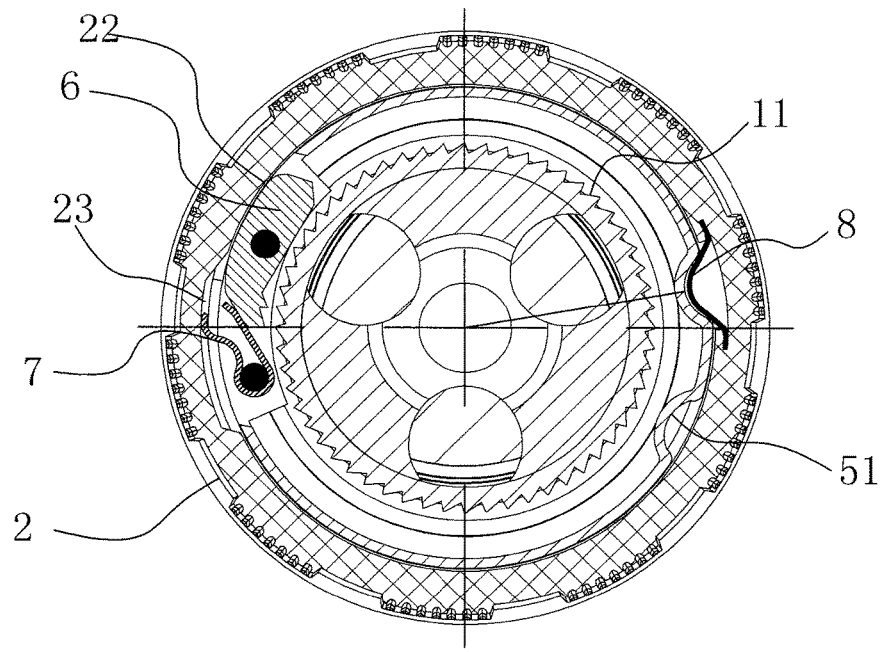
FIG. 3 is a cross-sectional view of an embodiment of the present invention showing the matching of the self-locking structure under the unlocking state.
Figure 4:
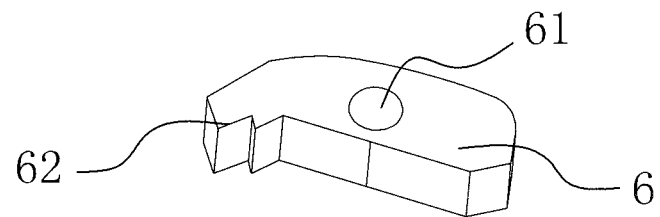
FIG. 4 is a schematic diagram of a locking block.
Figure 5:
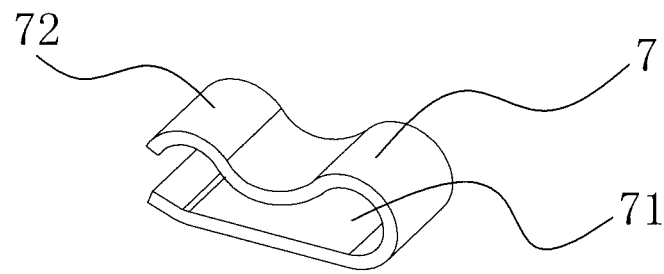
FIG. 5 is a schematic diagram of a convex leaf spring.
Figure 6:
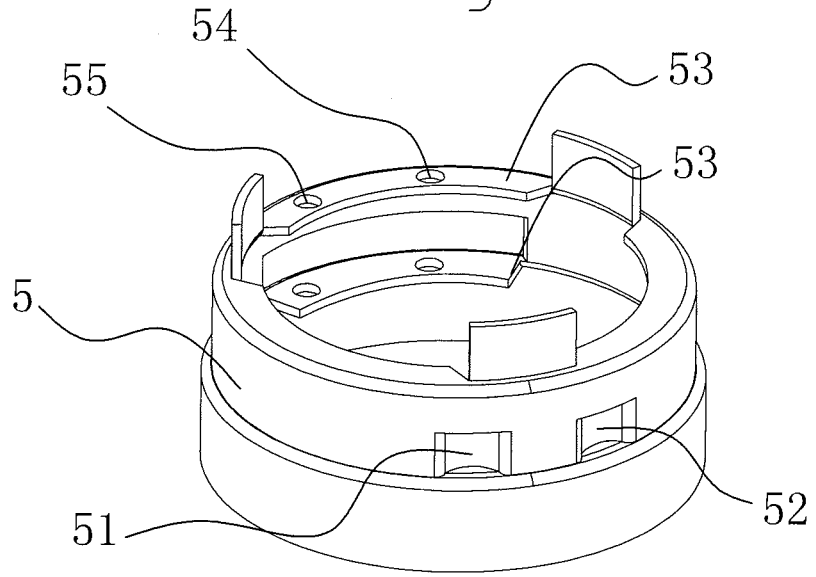
FIG. 6 is a schematic diagram of a ring fixedly connected with a nut.

Referring to FIG. 2, the first groove 51 is a groove corresponding to the drill chuck under the self-locking state, when the drill chuck enters the self-locking state, the convex portion of the convex leaf spring 8 enters the first groove 51 to form positioning through the matching between the convex portion and the first groove 51 and maintain the self-locking state. Referring to FIG. 3, the second groove 52 is a groove of the drill chuck converting from self-locking state to the unlocking state, when the rotating sleeve is rotated to convex portion of the convex leaf spring 8 to enter the second groove, the drill chuck is converted from self-locking state to unlocking state, to form positioning through the matching between the convex portion and the second groove 52 and maintain the unlocking state.

The self-locking structure includes a ring tooth 11 on the drill body 1 and rotatable locking block 6 arranged on the nut 5, the ring tooth 11 is a ratchet, the ring 5 is provided with a leaf spring 7, the rotating sleeve 2 is provided with a first part 21 compressing the leaf spring 7 and a second part 22 compressing the locking block 6, and by compressing the leaf spring 7 via the first part 21, the leaf spring 7 compresses the locking block 6, to rotate the locking block 6 and engage with teeth 11 on the drill body, drill chuck enters self-locking, and when it is required to de-lock, rotate the rotating sleeve, and when rotating to the second part 22 to compress the locking block 6, the locking block reverses to break away from the tooth, a gap between the rotating sleeve 2 and the tooth 11 is provided with for lifting the locking block 6 out of the tooth 11. With this structure, self-locking and unlocking switching is achieved through a lever, and the interference phenomenon will not occur within the self-locking structure, which can improve the operating feel and enhance the self-locking force.

The figure code 61 is a shaft hole of a locking block, the figure code 37 is a revolving shaft of a locking block, and the figure code 62 is an end engaged between locking block 6 and tooth 11, which is mounted on the ring 5. The leaf spring 7 is a rotatable leaf spring. The figure code 36 is a leaf spring revolving shaft secured to ring 5, and leaf spring has a portion 72 for engaging with rotating sleeve and a portion 71 for engaging with locking block. A rotatable locking block and a leaf spring are provided on the ring, and a double-layer mounting plate 53 is provided on the ring for installation of locking block revolving shaft 37 and leaf spring revolving shaft 36. The mounting holes 54, 55 of the shafts 36, 37 are provided on the mounting plate.

A run-out groove 23 of the leaf spring is provided in the rotating sleeve 2.

The above description is only specific embodiments of the invention, but it is not limited to these structural features. Any changes or modifications made by those skilled in the art within the scope of the present invention will fall into the scope of protection in the invention.

The invention claimed is:

1. A self-locking drill chuck, comprising a drill body, a nut, a clamping jaw, a self-locking structure, and a rotating sleeve, wherein the rotating sleeve is provided with a convex leaf spring fixed to the rotating sleeve at both ends, the nut or a ring fixedly connected with the nut is provided with a first groove and a second groove matching with a convex portion of the convex leaf spring, the drill chuck in a self-locking state when the convex portion of the convex leaf spring is in the first groove, and the drill chuck in an unlock state when the convex portion of the convex leaf spring is in the second groove;

the self-locking structure comprises a ring tooth on the drill body and a rotatable locking block arranged on the nut or ring fixedly connected to the nut, the nut or ring fixedly connected to the nut is provided with a leaf spring, the rotating sleeve is provided with a first part compressing the leaf spring and a second part compressing the locking block, and by compressing the leaf spring via the first part, the leaf spring compresses and rotates the locking block, the drill chuck enters the self-locking state when the locking block engages with the teeth on the drill body, and through compressing the locking block by the second part, the locking block reverses to break away from the tooth, a gap between the rotating sleeve and the tooth is provided with for lifting the locking block out of the tooth.

2. A self-locking drill chuck according to claim 1, wherein the leaf spring is a rotatable leaf spring and a run-out groove of the leaf spring is provided in the rotating sleeve.

3. A self-locking drill chuck according to claim 1, wherein the rotatable locking block and the leaf spring are provided on the ring, and a double-layer mounting plate is provided on the ring for installation of a locking block revolving shaft and a leaf spring revolving shaft.

* * * * *